(12) United States Patent
Han et al.

(10) Patent No.: US 11,381,952 B2
(45) Date of Patent: *Jul. 5, 2022

(54) METHOD AND APPARATUS FOR TRANSMITTING WARNING INFORMATION

(71) Applicant: ZTE CORPORATION, Guangdong (CN)

(72) Inventors: Jiren Han, Shenzhen (CN); He Huang, Shenzhen (CN); Yin Gao, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/203,948

(22) Filed: Mar. 17, 2021

(65) Prior Publication Data

US 2021/0227373 A1   Jul. 22, 2021

Related U.S. Application Data

(63) Continuation of application No. 16/874,505, filed on May 14, 2020, now Pat. No. 10,979,884, which is a (Continued)

(30) Foreign Application Priority Data

Nov. 17, 2017   (CN) .......................... 201711147140.1

(51) Int. Cl.
*H04W 4/90* (2018.01)
*H04W 4/02* (2018.01)

(52) U.S. Cl.
CPC ............. *H04W 4/90* (2018.02); *H04W 4/023* (2013.01)

(58) Field of Classification Search
CPC ... H04W 76/27; H04W 72/042; H04W 76/11; H04W 4/90; H04W 76/50; H04W 4/06;
(Continued)

(56) References Cited

U.S. PATENT DOCUMENTS

2012/0040636 A1* 2/2012 Kazmi .................. H04W 76/50
455/404.1
2014/0348067 A1 11/2014 Previti
(Continued)

FOREIGN PATENT DOCUMENTS

CN   101686430       3/2010
CN   104221297 A    12/2014
(Continued)

OTHER PUBLICATIONS

International Search Report and Written Opinion of the International Searching Authority for PCT/CN2018/116111 dated Feb. 3, 2019 (9 pages).
(Continued)

*Primary Examiner* — Dung Hong
(74) *Attorney, Agent, or Firm* — Foley & Lardner LLP

(57) ABSTRACT

Provided are a method and apparatus for transmitting warning information. The method includes: generating, by a centralized unit (CU), a warning radio resource control (RRC) message, where the warning RRC message is system information of a public warning system (PWS); and transmitting, by the CU, the warning RRC message to a DU through a public warning request message.

20 Claims, 4 Drawing Sheets

The CU generates a warning RRC message, where the warning RRC message is system information of a PWS — S102

The CU transmits the warning RRC message to a DU through a public warning request message — S104

Related U.S. Application Data continuation of application No. PCT/CN2018/116111, filed on Nov. 19, 2018.

(58) Field of Classification Search
CPC ... H04W 68/005; H04W 68/00; H04W 68/02; H04W 28/02; H04W 72/005; H04W 48/06; H04W 4/029; H04W 28/12; H04W 28/10; H04L 63/0853; H04L 12/1845; H04H 20/59; H04H 20/16

See application file for complete search history.

(56) References Cited

U.S. PATENT DOCUMENTS

| | | | |
|---|---|---|---|
| 2016/0286385 A1* | 9/2016 | Ryu | H04W 76/28 |
| 2016/0337010 A1 | 11/2016 | Park et al. | |
| 2017/0331785 A1 | 11/2017 | Xu et al. | |
| 2018/0302878 A1* | 10/2018 | Byun | H04W 88/16 |
| 2018/0338277 A1* | 11/2018 | Byun | H04W 88/08 |
| 2018/0352416 A1* | 12/2018 | Ryu | H04W 4/08 |
| 2019/0075447 A1* | 3/2019 | Lee | H04W 8/20 |
| 2019/0150220 A1* | 5/2019 | Byun | H04W 68/02 370/329 |
| 2019/0313366 A1* | 10/2019 | Shim | H04W 56/001 |
| 2020/0260410 A1* | 8/2020 | Byun | H04W 68/02 |

FOREIGN PATENT DOCUMENTS

| | | | |
|---|---|---|---|
| CN | 205154714 U | 4/2016 | |
| EP | 2104382 A2 * | 9/2009 | H04W 4/90 |
| JP | 2017103694 A * | 6/2017 | |
| JP | 2019-523601 A | 8/2019 | |
| KR | 20160137447 A | 11/2016 | |
| WO | WO-2018/190636 A1 | 10/2018 | |

OTHER PUBLICATIONS

Non-Final Office Action on U.S. Appl. No. 16/874,505 dated Sep. 29, 2020.

Notice of Allowance on U.S. Appl. No. 16/874,505 dated Jan. 15, 2021.

CATT, "Consideration on the RRC Message Transfer Between CU and DU", 3GPP TSG RAN WG3 Meeting #96, 3GPP R3-171456, May 19, 2017, Hangzhou, China (3 pages).

First Office Action on CN 201711147140.1 dated Apr. 23, 2021 (13 pages, including English translation).

NEC Corporation, "NEC develops NFV C-RAN solution: Press Releases", Tokyo, Japan, Aug. 16, 2016, (2 pages) obtained from: https://www.baidu.com/link?url=zzyNSJWpUOUSG2zc7mHQCN58ux0ZUyuiS9fPtTv4nNVgP5pa89xN4nS2x2vbxMC0x2RwEqewFDIBUSQT5f8MaN2EvHQxTHhqzG9XYFX_Wyy&wd=&eqid=f86dd9870000395c00000006606d6f74.

China Telecom: "On the ways of SI message generation and transportation in disaggregated gNB" 3GPP TSG-RAN3 #97; R3-173043; Aug. 25, 2017; Berlin, Germany (5 pages).

Extended European Search Report for EP Appl. No. 18877545.6, dated Jul. 2, 2021 (9 pages).

Huawei: "System Information Delivery over F1" 3GPP TSG RAN WG3 meeting #97; R3-173103; Aug. 25, 2017; Berlin, Germany (4 pages).

First Office Action for JP Appl. No. 2020-526951, dated Jul. 28, 2021 (with English translation, 14 pages).

Samsung: "Discussions on system information message delivery between gNB-CU and gNB-DU" 3GPP TSG-RAN WG3 Meeting #97 bis; R3-173846; Oct. 9-13, 2017; Prague, Czech (5 pages).

First KR Office Action on KR 10-2020-7017181 dated May 20, 2021 (9 pages, including English translation).

* cited by examiner

METHOD AND APPARATUS FOR TRANSMITTING WARNING INFORMATION

CROSS-REFERENCE TO RELATED APPLICATIONS

This application claims the benefit of priority under 35 U.S.C. § 120 as a continuation of U.S. Non-Provisional application Ser. No. 16/874,505, filed on May 14, 2020, which is a continuation of PCT Application no. PCT/CN2018/116111, filed on Nov. 19, 2018, which claims priority to Chinese Patent Application No. 201711147140.1, filed on Nov. 17, 2017, the disclosure of each of which is incorporated in its entirety by reference herein.

TECHNICAL FIELD

The present disclosure relates to the field of telecommunication technologies, for example, to a method and an apparatus for transmitting warning information.

BACKGROUND

The fifth generation mobile communication technology (5G) network architecture has innovation and networking flexibility, and a base station on a wireless access network side in the 5G network is separated into two functional entities, i.e., a centralized unit (CU) and a distributed unit (DU). Controlling multiple distributed units by the centralized unit may implement the baseband centralized processing of a cloud architecture and provide services distributedly for far-ends of users. In the CU-DU separative network architecture, network functions which are insensitive to time delay are placed in a CU, and network functions which are sensitive to time delay are placed in a DU; on one hand, a large amount of core network signaling overhead is saved, on the other hand, time delay of switching is reduced, and the mobility performance of a new radio (NR) system can be enhanced. Transmission and connection are performed between the CU and the DU through an F1 interface.

In a long term evolution (LTE) system, an earthquake and tsunami warning system (ETWS) important notification and an ETWS auxiliary notification are transmitted to user equipment (UE) through a system information block type10 (SIB10) and a system information block type11 (SIB11) in a base station system message. The SIB10 includes the ETWS important notification, and the SIB11 includes the ETWS auxiliary notification, and the existence or modification of the SIB10 and the SIB11 are notified to UE through a paging message. When the UE monitors the paging message, the UE determines whether the paging message includes an ETWS indication field. If the paging message includes the ETWS indication field, the UE starts to receive the SIB10 including the ETWS important notification and the SIB11 including the ETWS auxiliary notification according to a scheduling info list field of the SIB11 in the base station system message. The base station will continuously transmit the paging message including the EWTS indication field after the warning information occurs, to ensure that all UEs in the service area can receive the paging message.

In the 5G, the ETWS under the CU-DU networking architecture, including a system information position corresponding to the ETWS and a basic disaster warning process on the F1 interface, has not been determined yet, which causes the CU and the DU unable to perform the warning notification normally.

SUMMARY

The present disclosure provides a method and an apparatus for transmitting warning information to at least solve the problem that a warning notification is unable to be performed in a CU-DU networking architecture.

The present disclosure provides a method for transmitting warning information, including: generating, by a centralized unit (CU), a warning radio resource control (RRC) message; where the warning RRC message is system information of a public warning system (PWS); and transmitting, by the CU, the warning RRC message to a DU through a public warning request message.

The present disclosure further provides a method for transmitting warning information, including: receiving, by a distributed unit (DU), a warning parameter transmitted by a CU through a public warning request message; generating, by the DU, a warning RRC message by using the warning parameter, where the warning RRC message is system information of a public warning system (PWS); and transmitting, by the DU, the warning RRC message to the CU through a public warning response message.

The present disclosure further provides an apparatus for transmitting warning information, applied to a CU, including: a generation module, which is arranged to generate a warning radio resource control (RRC) message, where the warning RRC message is system information of a public warning system; and a transmission module, which is arranged to transmit the warning RRC message to a DU through a public warning request message.

The present disclosure further provides an apparatus for transmitting warning information, applied to a DU, including: a reception module, which is arranged to receive a warning parameter transmitted by a CU through a public warning request message; a generation module, which is arranged to generate a warning radio resource control (RRC) message by using the warning parameter, where the warning RRC message is system information of a public warning system; and a transmission module, which is arranged to transmit the warning RRC message to the CU through a public warning response message.

The present disclosure further provides a storage medium. The storage medium includes stored programs which, when being executed, perform any method described above.

The present disclosure further provides a processor. The processor is arranged to execute programs which, when being executed, perform any method described above.

DETAILED DESCRIPTION

The present disclosure will be described hereinafter in detail with reference to the drawings and in conjunction with embodiments.

The terms "first", "second" and the like in the description, claims and above drawings of the present disclosure are used to distinguish between similar objects and are not necessarily used to describe a particular order or sequence.

Embodiment One

A network architecture that may be executed in an embodiment includes: a CU and a DU, where information is exchanged between the CU and the DU.

Figure 1:
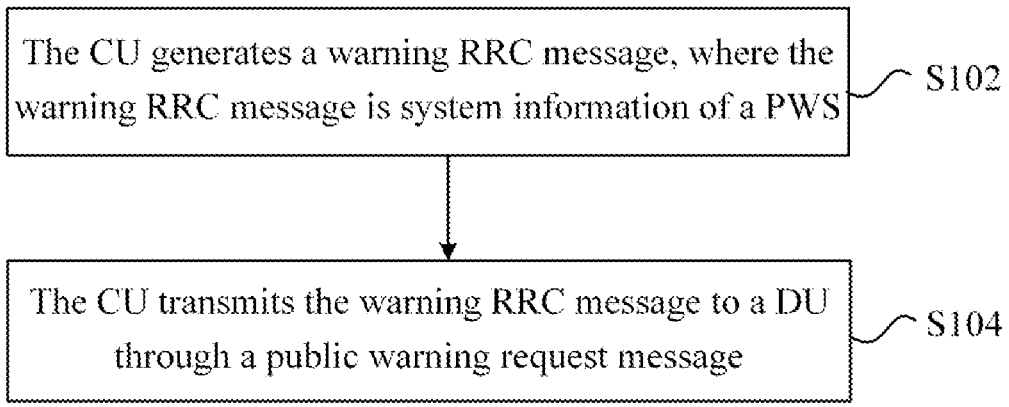
FIG. 1 is a flowchart of a method for transmitting warning information provided by an embodiment of the present disclosure.

FIG. 1 is a flowchart of a method for transmitting warning information provided by an embodiment of the present disclosure. As shown in FIG. 1, the method provided by the embodiment includes the steps described below.

In step S102, the CU generates a warning RRC message, and the warning RRC message is system information of a PWS.

In step S104, the CU transmits the warning RRC message to the DU through a public warning request message.

Through the above steps, the CU transmits the warning RRC message to the DU through the public warning request message, which implements a ETWS under the CU-DU networking architecture, solves the problem that the warning notification is unable to be performed under the CU-DU networking architecture, and improves disaster tolerance performance and stability of the network.

In an embodiment, the above steps may, but may not necessarily, be executed by a CU.

In an embodiment, the public warning request message includes at least one of: a warning message type, a warning message identifier, a warning message serial number, a warning area list, a repetition period, a number of broadcast requests, a warning concurrent indication and the warning RRC message.

In an embodiment, the warning RRC message includes at least one of: the warning message identifier, the warning message serial number, a warning type, warning security information, a data encoding mechanism and a warning message content.

In an embodiment, the step in which the CU transmits the warning RRC message to the DU through the public warning request message includes: transmitting, by the CU, the warning RRC message to the DU through the public warning request message by using an F1 interface.

In an embodiment, the step in which the CU generates the warning RRC message includes: segmenting, by the CU, the warning message content, and generating the warning RRC message according to the segmented warning message content.

In an embodiment, after the step in which the CU transmits the warning RRC message to the DU through the public warning request message, the method further includes: receiving a public warning response message fed back by the DU.

In an embodiment, the public warning response message at least includes: the warning message type, the warning message identifier, the warning message serial number, and a warning broadcast completed area list.

In an embodiment, the warning message identifier and the warning message serial number are transmitted in one of followings manners: transmitted by being carried in an RRC container, and transmitted through an F1 interface.

In an embodiment, the warning area list is in form of a cell list, and the warning broadcast completed area list is in form of a cell list.

In an embodiment, the method further includes: generating a PWS cancellation request message and transmitting the PWS cancellation request message to the DU through an F1 interface, where the PWS cancellation request message is used for indicating to terminate the warning RRC message; and receiving a PWS cancellation response message fed back by the DU.

In an embodiment, the PWS cancellation request message at least includes: the warning message type, the warning message identifier, the warning message serial number, and a warning to be cancelled area list; the PWS cancellation response message at least includes: the warning message type, the warning message identifier, the warning message serial number and a warning cancelled area list.

In an embodiment, the warning to be cancelled area list is in form of a cell list, and the warning cancelled area list is in form of a cell list.

In an embodiment, the warning message identifier and the warning message serial number are transmitted in one of following manners: transmitted by being carried in an RRC container, and transmitted through an F1 interface.

In an embodiment, the method further includes: receiving a restart cell list and a failed cell list transmitted by the DU; and transmitting the restart cell list and the failed cell list to a core network device.

In an embodiment, in a case that the warning message identifier is transmitted by being carried in the RRC container, and the warning message identifier and the warning message serial number have been encoded in the warning RRC message, the method further includes: transmitting, by the CU, associated identification information of an F1 interface message to the DU, where the associated identification information is used for indicating a current warning process.

Figure 2:
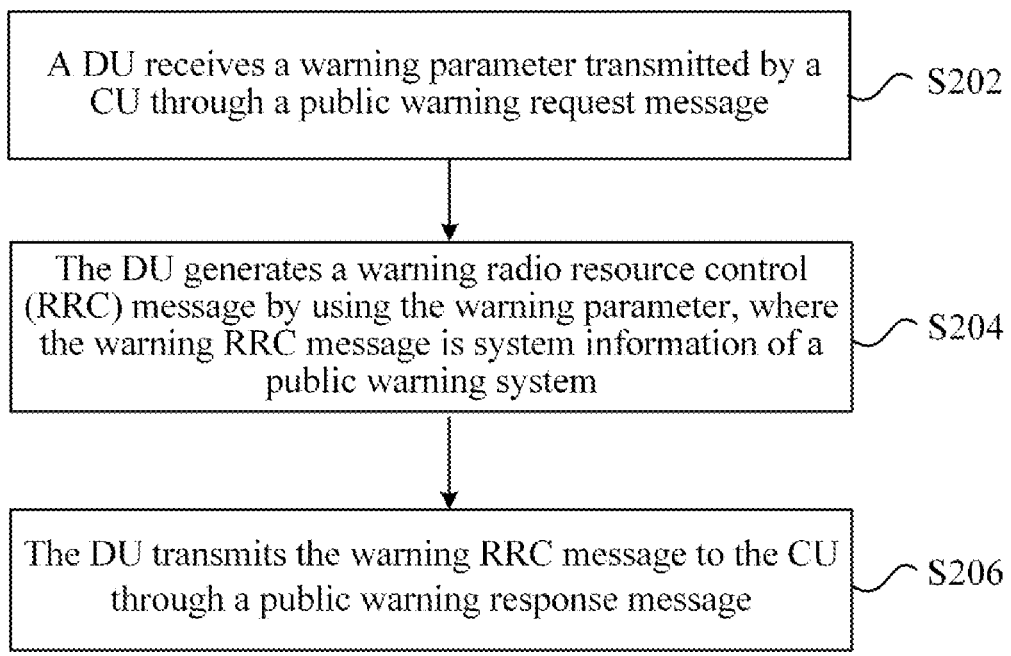
FIG. 2 is a flowchart of a method for transmitting warning information provided by an embodiment of the present disclosure.

FIG. 2 is a flowchart of a method for transmitting warning information provided by an embodiment of the present disclosure. As shown in FIG. 2, the method provided by the embodiment includes the steps described below.

In step S202, a DU receives a warning parameter transmitted by a CU through a public warning request message.

In step S204, the DU generates a warning radio resource control (RRC) message by using the warning parameter. The warning RRC message is system information of a public warning system.

In step S206, the DU transmits the warning RRC message to the CU through a public warning response message.

In an embodiment, the warning parameter at least includes one of: a warning message type, a warning message identifier, a warning area list, a warning message content, a warning message serial number, a repetition period, an extended repetition period, the number of broadcast requests, a warning type, warning security information, a data encoding mechanism and a concurrent warning message.

In an embodiment, the warning RRC message at least includes one of: the warning message identifier, the warning message serial number, the warning type, the warning security information, the data encoding mechanism and the warning message content.

In an embodiment, the public warning response message at least includes: the warning message type, the warning message identifier, the warning message serial number, and a warning broadcast completed area list.

In an embodiment, the method further includes: receiving a PWS cancellation request message transmitted by the CU, generating a PWS cancellation response message, and transmitting the PWS cancellation response message to the CU through an F1 interface, where the PWS cancellation request message is used for indicating to terminate a warning; and feeding back the PWS cancellation response message to the CU.

In an embodiment, the PWS cancellation request message at least includes: the warning message type, the warning message identifier, the warning message serial number, and a warning to be cancelled area list; the PWS cancellation response message at least includes: the warning message type, the warning message identifier, the warning message serial number and a warning cancelled area list.

In an embodiment, the method further includes: transmitting a restart cell list and a failed cell list to the CU to enable the CU to transmit the restart cell list and the failed cell list to a core network device.

In an embodiment, the warning area list is in form of a cell list, and the warning broadcast completed area list is in form of a cell list.

In an embodiment, the warning to be cancelled area list is in form of a cell list, and the warning cancelled area list is in form of a cell list.

In an embodiment, the warning message identifier and the warning message serial number are transmitted in one of following manners: transmitted by being carried in an RRC container, and transmitted through an F1 interface.

In an embodiment, in a case that the warning message identifier is transmitted by being carried in the RRC container, and the warning message identifier and the warning message serial number have been encoded in the warning RRC message, the method further includes: transmitting associated identification information of an F1 interface message transmitted by the CU, where the associated identification information is used for indicating a current warning process.

From the description of the implementation modes described above, it may be understood by those skilled in the art that the methods in the embodiments described above may be implemented by software plus a necessary general-purpose hardware platform, or may of course be implemented by hardware. However, in many cases, the former is a preferred implementation mode. Based on such understanding, the solution provided by the present disclosure may be embodied in the form of a software product. The computer software product is stored in a non-transient storage medium (such as a read-only memory (ROM), a random-access memory (RAM), a magnetic disk or an optical disk) and the storage medium includes multiple instructions for enabling a terminal device (which may be a mobile phone, a computer, a server, or a network device) to perform the method described in any embodiment of the present disclosure.

Embodiment Two

An embodiment further provides an apparatus for transmitting warning information. The apparatus is arranged to implement the above-mentioned embodiments, so what has been described will not be repeated. As used below, the term "module" may be software, hardware or a combination thereof capable of implementing a predetermined function. The apparatus described below in the embodiments may be implemented by software, but implementation by hardware or by a combination of software and hardware is also possible and conceived.

Figure 3:
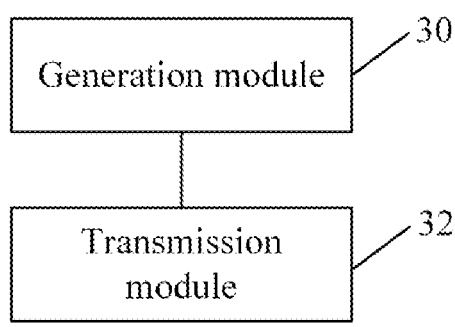
FIG. 3 is a block diagram of an apparatus for transmitting warning information provided by an embodiment of the present disclosure.

FIG. 3 is a block diagram of an apparatus for transmitting warning information provided by an embodiment of the present disclosure. The apparatus provided by the embodiment is applied to a CU. As shown in FIG. 3, the apparatus provided by the embodiment includes: a generation module 30, which is arranged to generate a warning radio resource control (RRC) message, where the warning RRC message is system information of a public warning system; and a transmission module 32, which is arranged to transmit the warning RRC message to a DU through a public warning request message.

Figure 4:
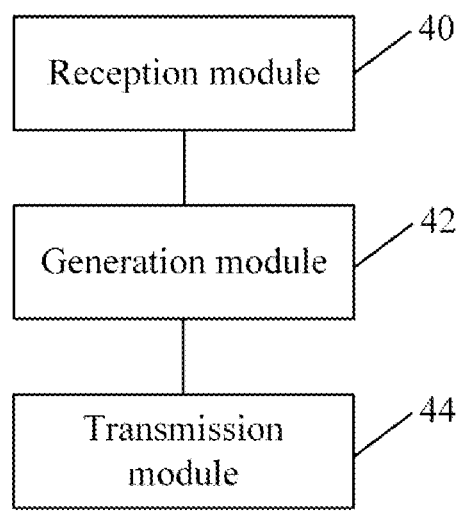
FIG. 4 is a block diagram of an apparatus for transmitting warning information provided by an embodiment of the present disclosure.

FIG. 4 is a block diagram of an apparatus for transmitting warning information provided by an embodiment of the present disclosure. As shown in FIG. 4, the apparatus provided by the embodiment is applied to a DU, including: a reception module 40, which is arranged to receive a warning parameter transmitted by a CU through a public warning request message; a generation module 42, which is arranged to generate a warning radio resource control (RRC) message by using the warning parameter, where the warning RRC message is system information of a public warning system; and a transmission module 44, which is arranged to transmit the warning RRC message to the CU through a public warning response message.

In an embodiment, any modules described above may be implemented by software or hardware. Implementation by hardware may, but may not necessarily, be performed as follows: multiple modules described above are located in a same processor or located in different processors respectively.

Embodiment Three

An embodiment provides an ETWS under a CU-DU networking architecture in the next generation wireless communication. Application of the ETWS under 5G CU-DU architecture is clearly specified, such as system information corresponding to the ETWS and a basic disaster warning process on an F1 interface are clearly specified.

In the embodiment, according to the generation of a warning RRC message, two cases may be provided: a CU generates the warning RRC message; and a DU generates the warning RRC message.

The case where a CU generates a warning RRC message is described as follows. In a process of transmitting a warning message, the CU generates system information (SI) RRC message of a PWS, and transmits the RRC message to a DU through a public warning request message.

The above SI RRC message includes at least one of: 1. a warning message type, 2. a warning message identifier, 3. a warning message serial number, 4. a warning area list, 5. a repetition period, 6. an extended repetition period, 7. the number of broadcast requests, 8. a warning type, 9. warning security information, 10. a data encoding mechanism, 11. a warning message content and 12. a concurrent warning message indication.

Information 2, 3, 8, 9, 10, and 11 may be included in an SIB10 and an SIB11, and may be transmitted by the CU to the DU directly in a manner of an RRC container (CONTAINER). In an embodiment, the information 2, 3, 8, 9, 10 and 11 may alternatively be transmitted by the CU directly to the DU through an F1 interface.

Information 5, 6, 7, and 12 are configuration information required in a system information block (SIB) to be issued to a cell by the DU, and are transmitted by the CU to the DU through the F1 interface.

The information 4, the warning area list, may be transmitted in form of a cell list. That is, the CU may screen a cell list needs to be broadcast through a tracking area identify (TAI) list and warning area list information of an NG interface, and transmit the cell list to the DU through the F1 interface.

The information 11, the warning message content, needs to be segmented on the CU and pieces of segmentation information are transmitted through the F1 interface. In one embodiment, all pieces of segmentation information may be included in one piece of F1 interface message; or the pieces of segmentation information may be independently transmitted and independent feedbacks may be performed.

After receiving a warning processing request, the DU transmits a warning response message to the CU, and feeds back a processing result.

In an embodiment, the above warning response message at least includes: 1. the warning message type, 2. the warning message identifier, 3. the warning message serial number, and 4. a warning broadcast completed area list.

Information 2 and 3 may be included in an RRC container and transmitted directly by the CU to the DU. In an embodiment, the information 2 and 3 may alternatively be transmitted by the CU directly to the DU through the F1 interface.

The information 4, the warning broadcast completed area list, may be transmitted in form of a cell list.

In an embodiment, considering that DU may perform parallel processing and there may exists a delay problem, corresponding association information needs to be introduced on the F1 interface, which facilitates the CU performing warning message association, such as a session identifier (ID), and facilitates the CU generating a corresponding response message to feed back to an authentication management function (AMF). Or the warning message is associated by reusing a warning request and a warning response message on the NG interface.

In a process of warning cancellation, the CU generates a PWS cancellation request message, and transmits the PWS cancellation request message to the DU through the F1 interface to terminate the broadcast of warning information. After receiving the PWS cancellation request message, the DU feeds a PWS cancellation response message back to the CU through the F1 interface.

The above PWS cancellation request message at least includes: 1. the warning message type, 2. the warning message identifier, 3. the warning message serial number, and 4. a warning to be cancelled area list.

Information 2 and 3 may be included in an RRC container and transmitted directly by the CU to the DU. In an embodiment, the information 2 and 3 may alternatively be transmitted by the CU directly to the DU through the F1 interface.

The warning to be cancelled area list is of a level of a cell list.

The above PWS cancellation response message at least includes: 1. the warning message type, 2. the warning message identifier, 3. the warning message serial number, and 4. a warning cancelled area list.

In an embodiment, information 2 and 3 may be included in an RRC container and transmitted directly by the CU to the DU. In an embodiment, the information 2 and 3 may alternatively be transmitted by the CU directly to the DU through the F1 interface.

The warning cancelled area list is of a level of a cell list.

In an embodiment, considering that DU may perform parallel processing and there may exists a delay problem, corresponding association information needs to be introduced on the F1 interface, which facilitates the CU performing warning message association, such as a session identifier (ID), and facilitates the CU generating a corresponding response message to feed back to the authentication management function (AMF). Or the warning message is associated by reusing a warning request and a warning response message on the NG interface.

When performing a process of a PWS restart indication and a PWS failure indication, the DU needs to transmit a restart cell list and a failed cell list respectively to the CU through the F1 interface. The CU transmits a warning restart cell list and a warning failed cell list separately to a core network device through the NG interface as a warning restart area list in the PWS restart indication and a warning failed area list in the PWS failure indication.

An overall process of generating a warning RRC message in the DU is similar to the process of generating a warning RRC message in the CU. The difference is that all involved parameters need to be transmitted by the CU to the DU through an F1 interface.

Figure 5:
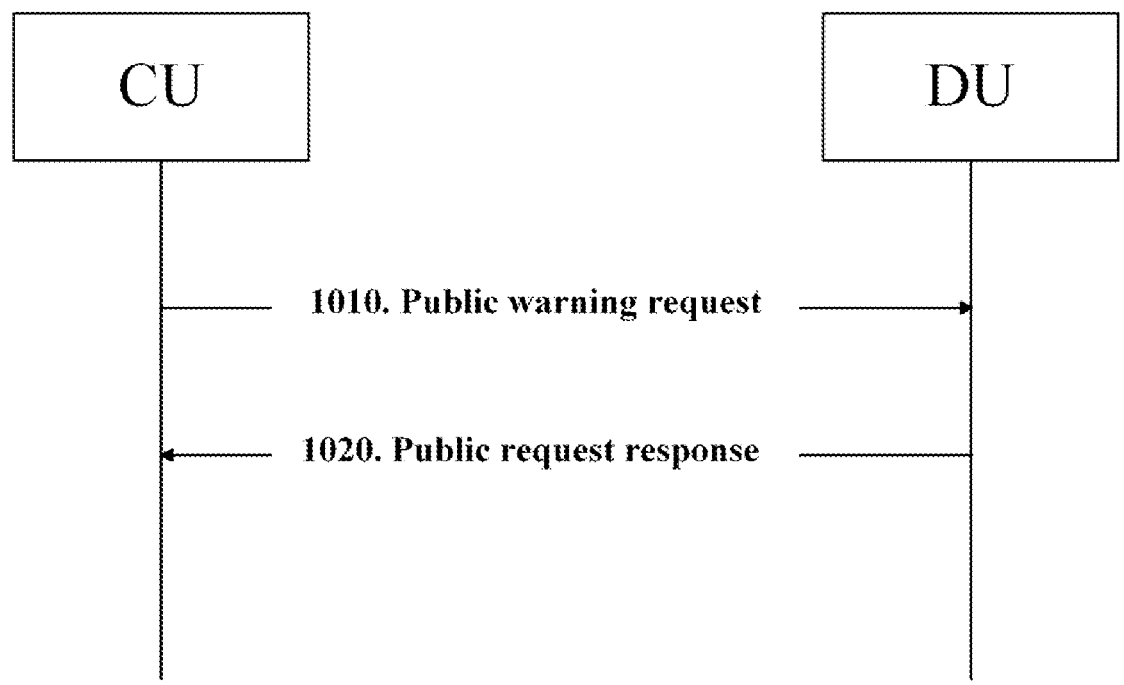
FIG. 5 is a flowchart of warning message transmission provided by an embodiment of the present disclosure.

FIG. 5 is a flowchart of a warning message transmission provided by an embodiment of the present disclosure. As shown in FIG. 5, the warning message transmission process provided by the embodiment includes the steps described below.

In step 1010, a CU transmits a public warning request message to a DU through an F1 interface.

In step 1020, the DU feeds a public warning response message back to the CU through the F1 interface according to obtained information.

Figure 6:
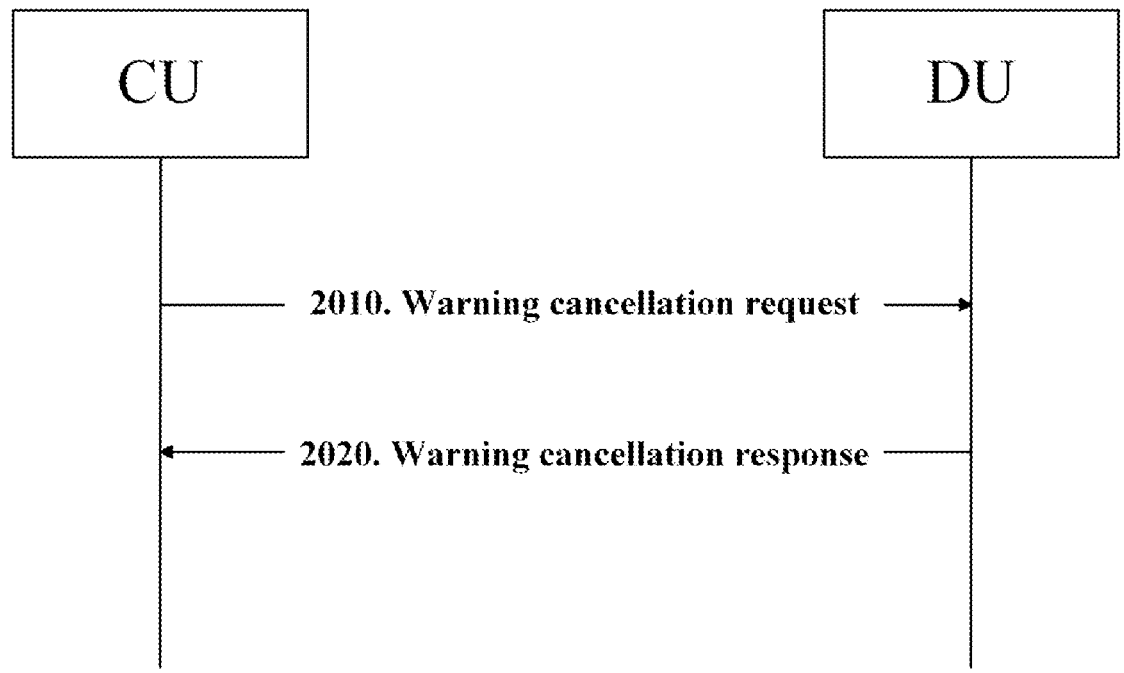
FIG. 6 is a flowchart of warning message cancellation provided by an embodiment of the present disclosure.

FIG. 6 is a flowchart of a warning message cancellation provided by an embodiment of the present disclosure. As shown in FIG. 6, the warning message cancellation process provided by the embodiment includes the steps described below.

In step 2010, a CU transmits a PWS cancellation request message to a DU through an F1 interface.

In step 2020, the DU feeds a PWS cancellation response message back to the CU through the F1 interface according to obtained information.

Figure 7:
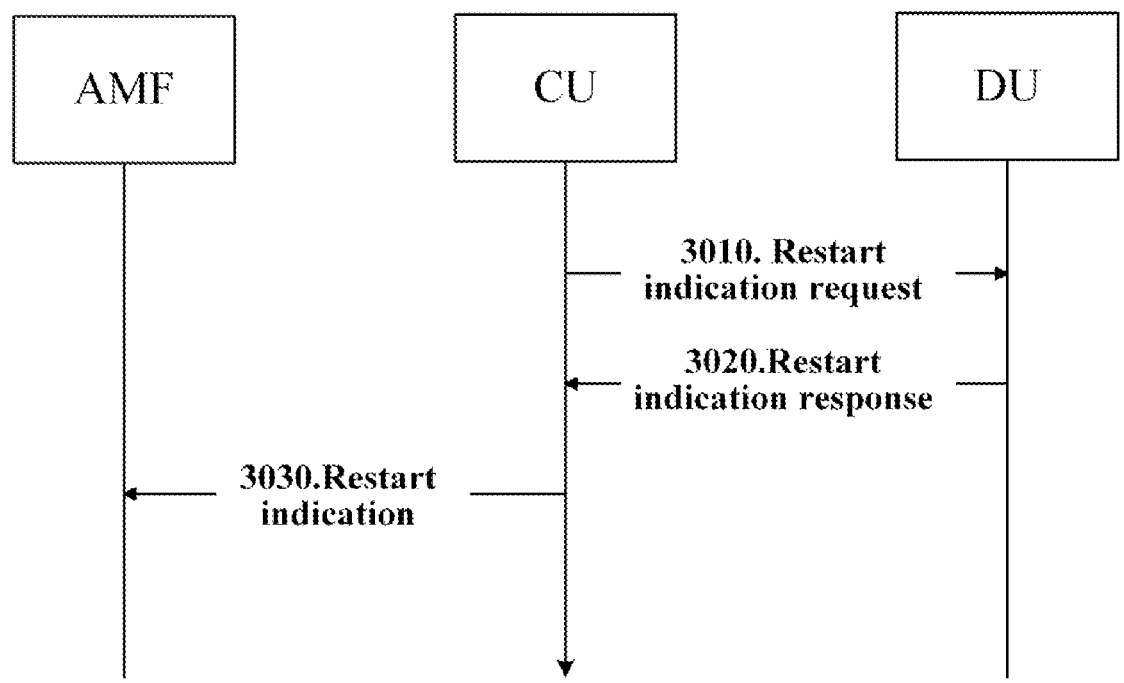
FIG. 7 is a flowchart of a PWS restart indication provided by an embodiment of the present disclosure.

FIG. 7 is a flowchart of a PWS restart indication provided by an embodiment of the present disclosure. As shown in FIG. 7, a process of the PWS restart indication provided by the embodiment includes the steps described below.

In step 3010, a CU transmits a restart indication request message to a DU through an F1 interface.

In step 3020, the DU transmits a warning restart cell list to the CU through a restart indication response message.

In step 3030, the CU encapsulates the received warning restart cell list into the PWS restart indication, and transmits the PWS restart indication to an AMF of a core network through an NG interface.

Figure 8:
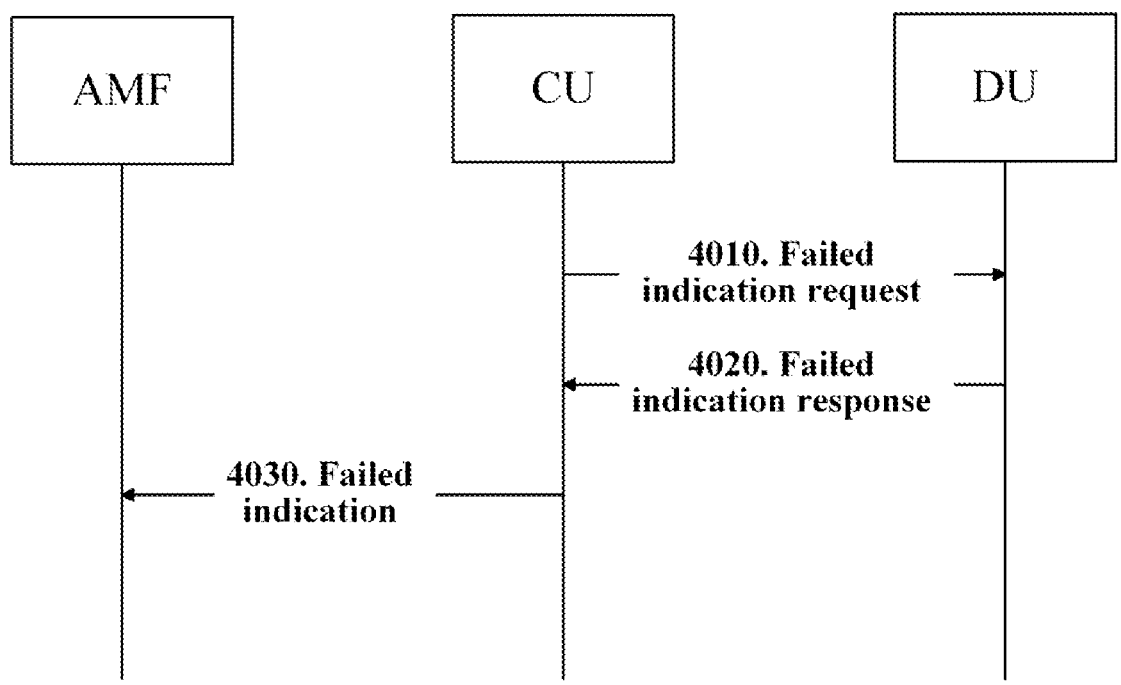
FIG. 8 is a flowchart of a PWS failure indication provided by an embodiment of the present disclosure.

FIG. 8 is a flowchart of a PWS failure indication provided by an embodiment of the present disclosure. As shown in FIG. 8, a process of the PWS failure indication provided by the embodiment includes the steps described below.

In step 4010, a CU transmits a failed indication request message to a DU through an F1 interface.

In step 4020, the DU transmits a warning failed cell list to the CU through a failed indication response message.

In step 4030, the CU encapsulates the received warning failed cell list into the PWS failure indication, and transmits the PWS failure indication to a core network device through an NG interface.

Embodiment Four

An embodiment further provides a storage medium. The storage medium includes stored programs which, when being executed, execute the method described in any one of the above-mentioned embodiments.

In an embodiment, the storage medium may be arranged to store program codes for executing the step described below.

In step S10, a warning radio resource control (RRC) message is generated. The warning RRC message is system information of a public warning system (PWS).

In an embodiment, the storage medium is further arranged to store program codes for executing the step described below.

In step S20, the warning RRC message is transmitted to a DU through a public warning request message.

In an embodiment, the storage medium may include, but is not limited to, at least one medium capable of storing program codes, such as a USB disk, an ROM, an RAM, a mobile hard disk, a magnetic disk and an optical disk.

An embodiment further provides a processor. The processor is arranged to execute programs which, when being executed, perform the steps in the method of any one of the above-mentioned embodiments.

In an embodiment, the programs described above are used for executing the steps described below.

In step S110, a warning radio resource control (RRC) message is generated. The warning RRC message is system information of a public warning system (PWS).

In step S120, the warning RRC message is transmitted to a DU through a public warning request message.

In an embodiment, for examples of the embodiment, reference may be made to the examples described in the above embodiments, which will not be repeated here.

Those skilled in the art should know that the above-mentioned at least one module or at least one step of the present disclosure may be implemented by a general-purpose computing apparatus, and the above-mentioned at least one module or at least one step may be concentrated on a single computing apparatus or distributed on a network composed of multiple computing apparatuses. In an embodiment, the above-mentioned at least one module or at least one step may be implemented by program codes executable by the computing apparatuses, so that they may be stored in a storage apparatus to be executed by the computing apparatuses. In some circumstances, the illustrated or described steps may be executed in sequences different from those described herein, or the above-mentioned at least one module or at least one step may be separately made into at least one integrated circuit module, or a plurality of modules or steps therein may be made into a single integrated circuit module for implementation. In this way, the present disclosure is not limited to any specific combination of hardware and software.

We claim:

1. A method for transmitting warning information, comprising:
generating, by a centralized unit (CU), a warning radio resource control (RRC) message, by:
segmenting, by the CU, warning message content, and
generating, by the CU, the warning RRC message according to the segmented warning message content, wherein the warning RRC message comprises system information of a public warning system (PWS);
transmitting, by the CU, the warning RRC message to a distributed unit (DU) through a public warning request message; and
receiving a public warning response message from the DU, after transmitting the warning RRC message to the DU through the public warning request message.

2. The method of claim 1, wherein the public warning request message comprises at least one of: a warning area list, a repetition period or a number of broadcast requests, and wherein the warning RRC message comprises at least one of: a warning message identifier, a warning message serial number, a data encoding mechanism or a warning message content.

3. The method of claim 2, wherein the warning area list is in a form of a cell list.

4. The method of claim 1, wherein the public warning response message comprises a warning broadcast completed area list.

5. The method of claim 4, wherein the warning broadcast completed area list is in a form of a cell list.

6. The method of claim 1, further comprising:
generating a PWS cancellation request message, and transmitting the PWS cancellation request message to the DU through an F1 interface, wherein the PWS cancellation request message is for indicating to terminate the warning RRC message; and
receiving a PWS cancellation response message from the DU.

7. The method of claim 6, wherein the PWS cancellation request message comprises a warning to be cancelled area list; and the PWS cancellation response message comprises a warning cancelled area list.

8. The method of claim 7, wherein the warning to be cancelled area list is in a form of a cell list, and the warning cancelled area list is in a form of a cell list.

9. The method of claim 1, further comprising:
receiving a restart cell list and a failed cell list from the DU; and
transmitting the restart cell list and the failed cell list to a core network device.

10. A device comprising:
at least one processor of a centralized unit (CU), configured to:
generate a warning radio resource control (RRC) message, by:
segmenting, by the CU, warning message content, and
generating, by the CU, the warning RRC message according to the segmented warning message content, wherein the warning RRC message comprises system information of a public warning system (PWS);
transmit the warning RRC message to a distributed unit (DU) through a public warning request message; and
receive a public warning response message from the DU, after transmitting the warning RRC message to the DU through the public warning request message.

11. The device of claim 10, wherein the public warning request message comprises at least one of: a warning area list, a repetition period or a number of broadcast requests, and the warning RRC message comprises at least one of: a warning message identifier, a warning message serial number, a data encoding mechanism or a warning message content.

12. The device of claim 11, wherein the warning area list is in a form of a cell list.

13. The device of claim 10, wherein the public warning response message comprises a warning broadcast completed area list.

14. The device of claim 13, wherein the warning broadcast completed area list is in form of a cell list.

15. The device of claim 10, wherein the at least one processor is further configured to:
   generate a PWS cancellation request message, and transmit the PWS cancellation request message to the DU through an F1 interface, wherein the PWS cancellation request message is for indicating to terminate the warning RRC message; and
   receive a PWS cancellation response message from the DU.

16. The device of claim 15, wherein the PWS cancellation request message comprises a warning to be cancelled area list; and the PWS cancellation response message comprises a warning cancelled area list.

17. The device of claim 16, wherein the warning to be cancelled area list is in a form of a cell list, and the warning cancelled area list is in a form of a cell list.

18. The device of claim 10, wherein the at least one processor is further configured to:
   receive a restart cell list and a failed cell list from the DU; and
   transmit the restart cell list and the failed cell list to a core network device.

19. A non-transitory computer readable storage medium storing instructions, which when executed by at least one processor can cause the at least one processor to:
   generate a warning radio resource control (RRC) message, by:
      segmenting, by the CU, warning message content, and
      generating, by the CU, the warning RRC message according to the segmented warning message content, wherein the warning RRC message comprises system information of a public warning system (PWS);
   transmit the warning RRC message to a distributed unit (DU) through a public warning request message; and
   receive a public warning response message from the DU, after transmitting the warning RRC message to the DU through the public warning request message.

20. The non-transitory computer readable storage medium of claim 19, wherein the public warning request message comprises at least one of: a warning area list, a repetition period or a number of broadcast requests, and the warning RRC message comprises at least one of: a warning message identifier, a warning message serial number, a data encoding mechanism or a warning message content.

* * * * *